March 6, 1934.   O. B. DURHOLZ   1,950,166
VARIABLE FOCUS LENS UNIT
Filed Sept. 14, 1931   4 Sheets-Sheet 1
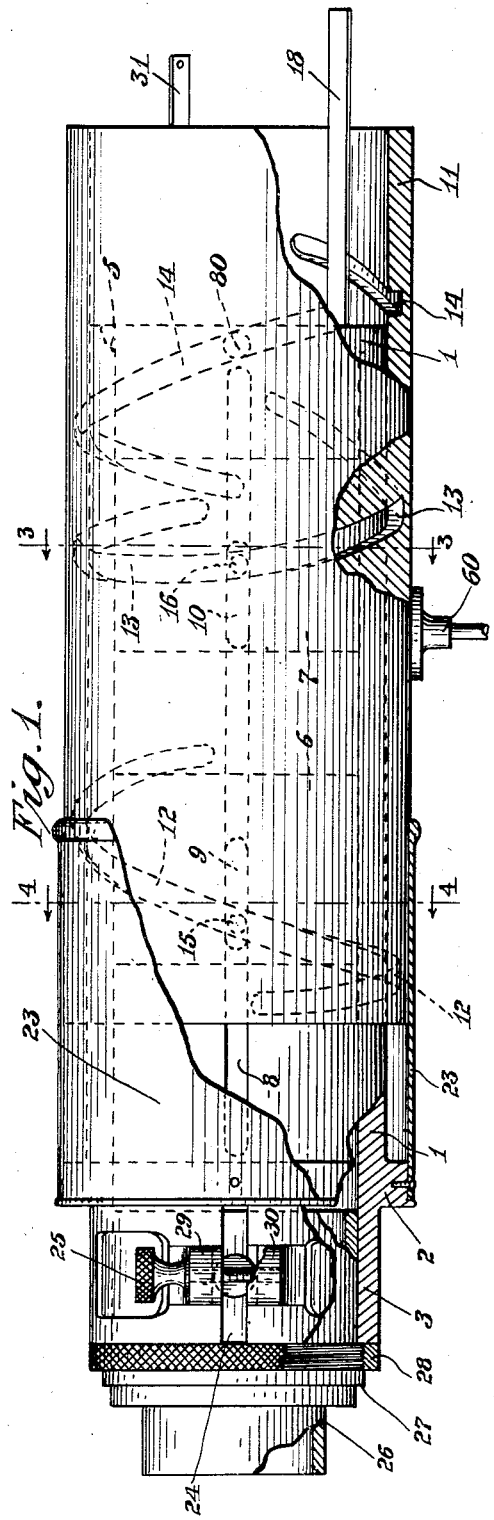
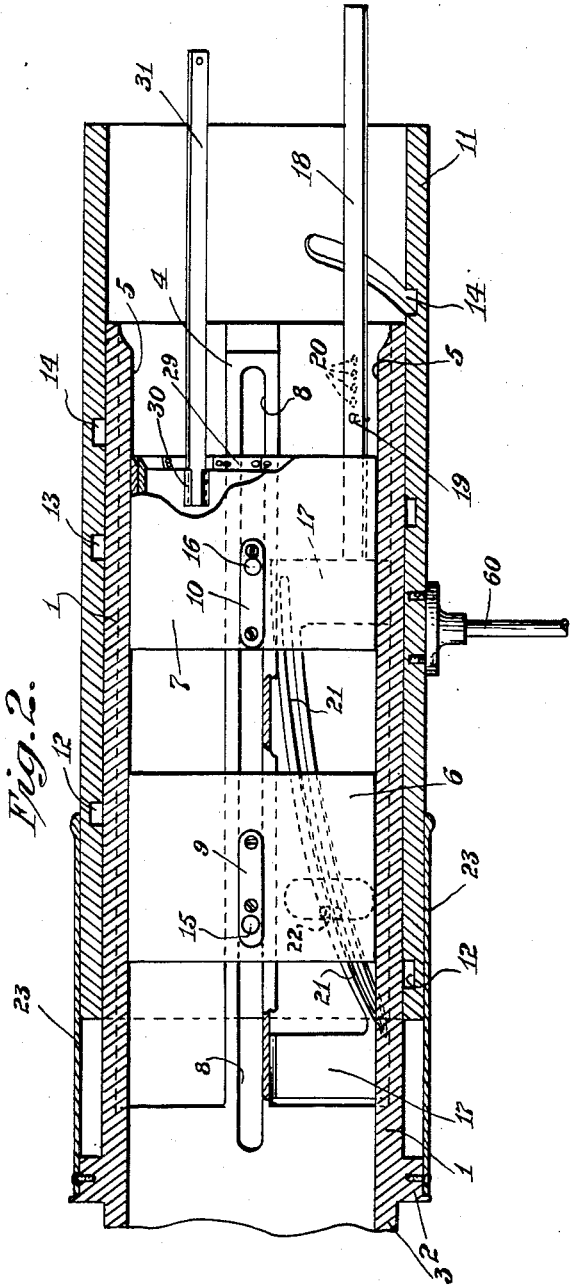
OTTO B. DURHOLZ
INVENTOR.
BY
ATTORNEY March 6, 1934.    O. B. DURHOLZ    1,950,166
VARIABLE FOCUS LENS UNIT
Filed Sept. 14, 1931    4 Sheets-Sheet 2
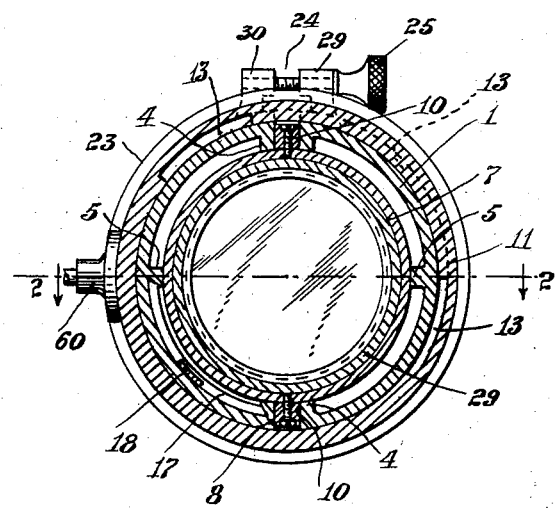
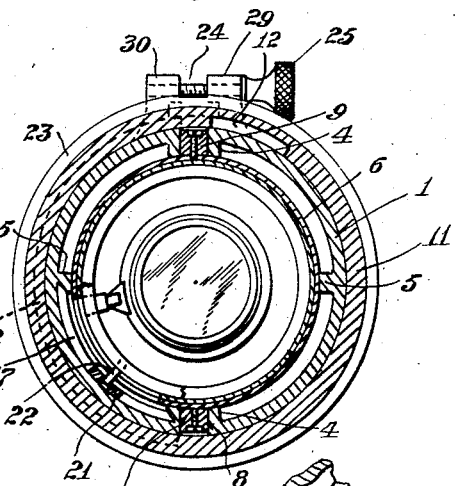
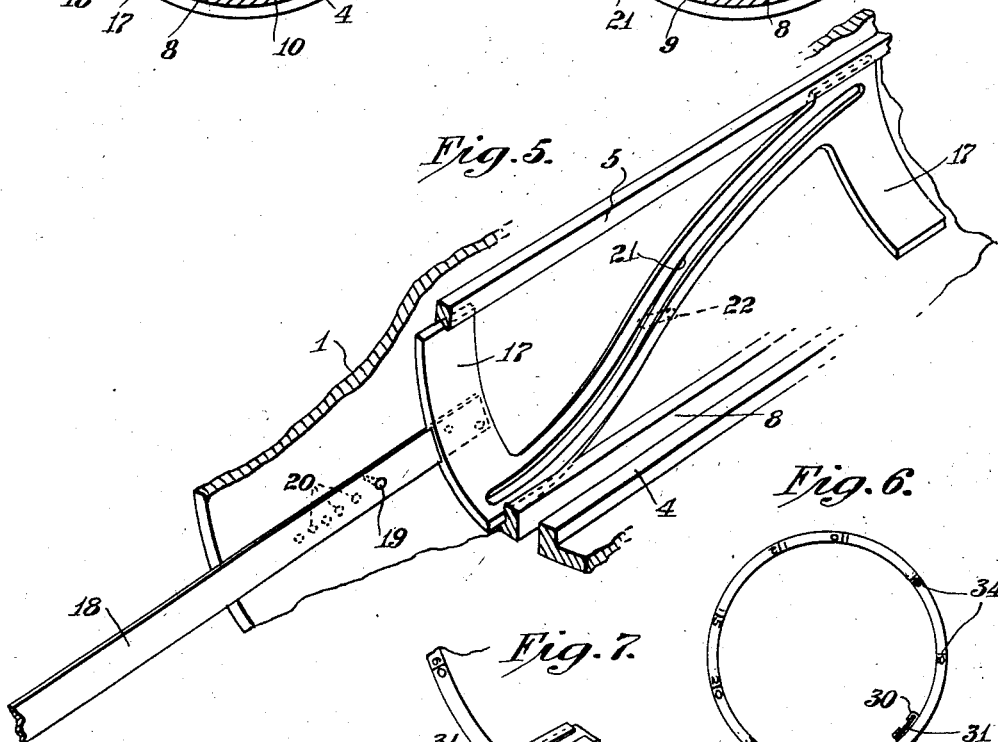
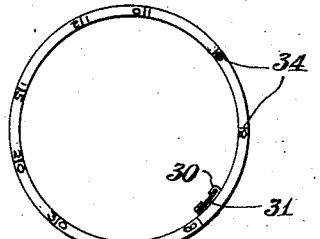
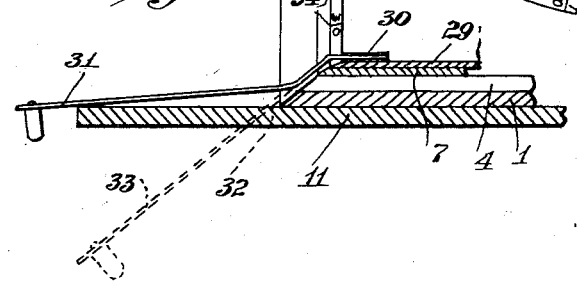
OTTO B. DURHOLZ
INVENTOR.
BY
ATTORNEY March 6, 1934.   O. B. DURHOLZ   1,950,166
VARIABLE FOCUS LENS UNIT
Filed Sept. 14, 1931   4 Sheets-Sheet 3
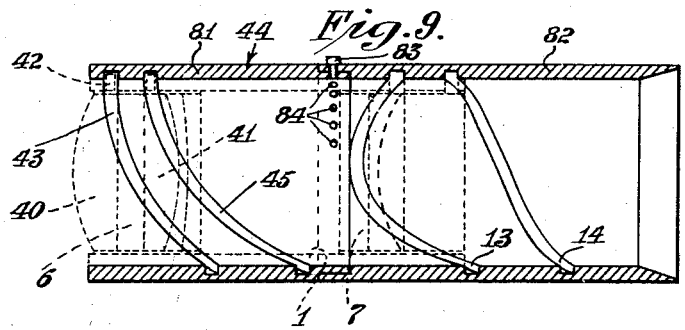
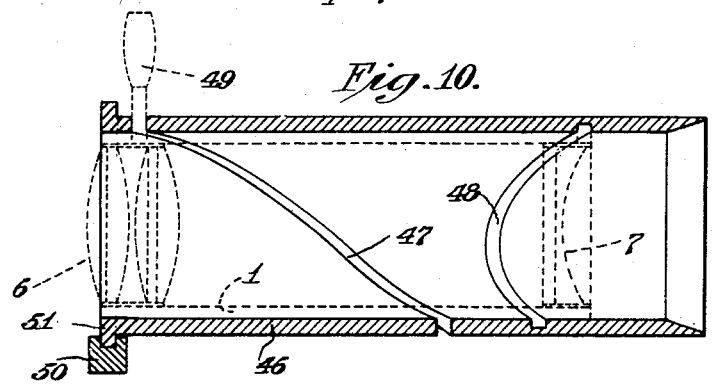
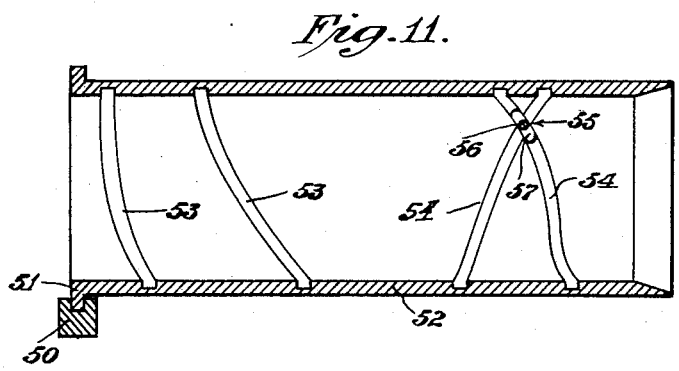
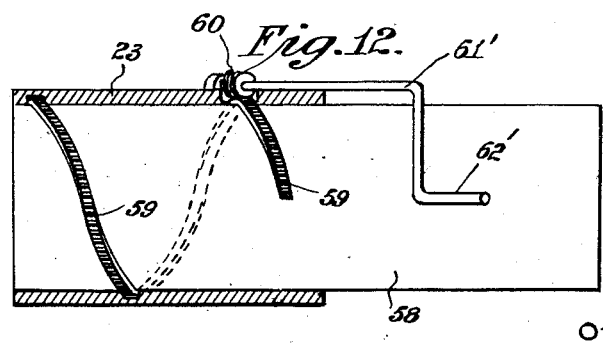
OTTO B. DURHOLZ
INVENTOR.
BY
ATTORNEY March 6, 1934.  O. B. DURHOLZ  1,950,166
VARIABLE FOCUS LENS UNIT
Filed Sept. 14, 1931  4 Sheets-Sheet 4

OTTO B. DURHOLZ
INVENTOR.

BY
ATTORNEY

Patented Mar. 6, 1934

1,950,166

UNITED STATES PATENT OFFICE 1,950,166

VARIABLE FOCUS LENS UNIT

Otto B. Durholz, Paterson, N. J.

Application September 14, 1931, Serial No. 562,728

12 Claims. (Cl. 95—45)

This invention relates to variable focus lens systems which are adapted to be controlled by means of a single adjustable member.

It is an object of my invention to provide an improved variable focus or telephoto lens unit which is adapted for attachment to existing cameras, e. g., those of the motion picture type, and in which, by moving a single adjustable member, varying degrees of magnification may be had, while at the same time maintaining the proper focus.

Another object is the provision of such a unit wherein control means is furnished for adjusting automatically the amount of light passing through the optical system thereof, and the provision of means whereby said control means may be adjusted, to compensate for variations in the amount of light available under the different conditions, the speed of the film, or for other photographic reasons.

An additional object is the provision of means whereby one of the lenses of the unit may be focused independently of another.

Still another object is the provision of adjustable stop means whereby the distance between the variable focus unit and the film of the camera to which it is attached, may be predetermined.

In accordance with my invention a variable focus or telephoto unit is made comprising a guide cylinder which is adapted slidably to support a pair of lenses displaced longitudinally of the unit. This guide cylinder is surrounded by a cam tube having a plurality of cams, certain of which are adapted to engage with the carriers of the lenses already mentioned, and move them with respect to one another and with respect to the guide cylinder, in a predetermined manner, whereby the size of the image projected by the lens on the film is varied, while the focus is maintained automatically.

For reducing the friction of the parts and for other mechanical reasons, an additional cam may be provided in said tube which engages a cam rider fixed to the guide cylinder. The function of this additional cam would be to move the entire cam tube longitudinally of the guide tube, moving with it the other cams and the associated lens carriers, whereby the slope of these other cams is lessened. These cams are preferably so shaped that for equal angles of rotation of said cam tube, equal percentages of variations in the size of the image cast on the film result. This last mentioned feature is of considerable importance from a practical viewpoint, because it enables a moving picture photographer to take a series of pictures while gradually varying the angle of the lens, and consequently the size of any given portion of the picture, with uniformity. If this correction in the cams were not made, rotation of the cam tube from an initial position to a given angle would cause a certain percentage variation of the size of an image on a film; whereas a subsequent movement of the cam tube through a similar angle would give a different percentage variation in the size of the image. Consequently, to produce a constant percentage increase or variation in the size of the photographed image, it would be necessary to rotate the cam tube at one speed during the initial part of its movement, and at a different speed during the final part of its movement.

Inside of the guide cylinder a cam is arranged for operating the diaphragm of one of the lenses in synchronism with variations of the focal length of the system, whereby a constant optical speed is obtained. In order to stop down or compensate for variations in the amount of light available for photographic purposes, or for the speed of the film used, means may be provided for adjusting the position of this cam, so that the diaphragm will pass the proper amount of light for any given set of conditions. This adjustment may consist of means for moving the cam longitudinally of the guide cylinder to different positions, or of means for rotating the lens with respect to the slip ring of the diaphragm system.

According to another feature of the invention, when the variable focus unit is used in conjunction with a moving picture camera, an operating connection may be provided between the driving mechanism of the camera and the adjusting mechanism of the variable focus unit. Such a connection permits the automatic operation of the camera and unit in synchronism so that a predetermined gradual increase or decrease in magnification results in a predetermined length of film. Likewise a connection to the camera shutter may be made so that the opening thereof is automatically varied in accordance with a variation in magnification of the variable focus unit, to maintain constant the photographic speed of the combined apparatus, thereby obviating the necessity for an adjustable iris or diaphragm in the unit.

The above mentioned and further objects and advantages of my invention and the manner of attaining them will be made clear in the following description and accompanying drawings.

In the drawings, Fig. 1 is a side elevation view partly in section of a variable focus lens unit constructed in accordance with my invention.

Fig. 2 is a view partly in section, of the device of Fig. 1 taken along line 2—2 of Fig. 3.

Fig. 3 is a sectional view taken along line 3—3 of Fig. 1.

Fig. 4 is a view taken along line 4—4 of Fig. 1.

Fig. 5 is a perspective view of a portion of the interior of the device shown in Fig. 1.

Fig. 6 is an end elevation view of the front lens carrier of the device of Fig. 1.

Fig. 7 is a perspective view of the lens carrier shown in Fig. 6.

Fig. 8 is a side elevation sectional view of the front lens carrier shown in Fig. 6.

Figs. 9 to 12 inclusive, show in section modified forms of cam tube mechanisms which may be incorporated in the structure of Fig. 1.

Figure 13:
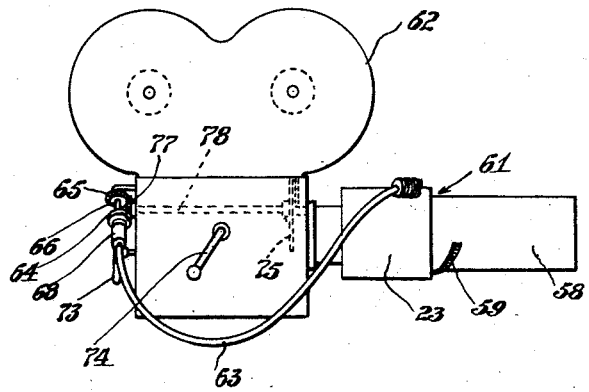

Fig. 13 is a view showing an automatic driving mechanism for interconnecting the variable focus lens unit with the camera shutter.

Figure 14:
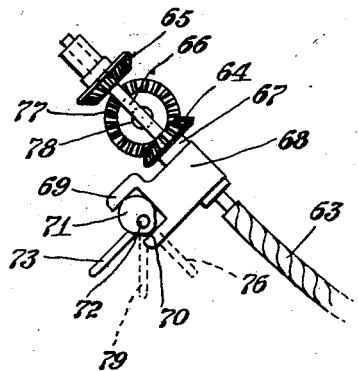

Fig. 14 is a detail view of a portion of the mechanism of Fig. 13.

Referring more particularly to the drawings, reference numeral 1 indicates a guide cylinder having a flange 2 and an extension 3 formed integral therewith. The guide cylinder has a pair of guide tracks 4 and a pair of guide tracks 5 formed on the interior surface thereof for slidably supporting two lens carriers 6 and 7. The tracks 4 have slots 8 therein which receive guide blocks 9 and 10 attached respectively to the lens carriers 6 and 7. The lens carriers are adapted freely to slide lengthwise of the cylinder and are prevented from rotating with respect thereto by the guide blocks. Slidably and rotatably mounted on the guide cylinder 1 is a cam tube 11 having three cam grooves 12, 13 and 14 cut in its inner surface. Cams 12 and 13 engage respectively with pins or cam riders 15 and 16 secured to the guide blocks 9 and 10 of the lens carriers 6 and 7, so that when the cam tube is rotated the lens carriers are moved longitudinally of the guide cylinder. The cam 14 engages with a cam rider or pin 80 fixed to the guide cylinder 1 and serves upon rotation of the cam tube to move the tube endwise of the guide cylinder, thereby supplementing the motion given to the lens carriers 6 and 7 by the cams 12 and 13.

The shape of the cam grooves 12, 13 and 14 is such as to maintain the lenses at all times focused on a fixed plane, corresponding to that of the film of the camera with which the unit is used. The cam 14 may be in the form of a helix, while the other two, 12 and 13, are of unsymmetrical shape, preferably such that rotations of the cam tube through equal angles give the same percentage change in magnification.

A cam plate 17 is slidably positioned in dovetailed fashion between guide tracks 4 and 5 and has secured thereto a finger 18 by which the endwise movement of the cam may be brought about. This finger 18 is resilient, being formed of spring steel or similar material, and has a stop pin 19 fixed to it which is adapted to engage with a plurality of depressions 20 formed in the inside face of the guide cylinder 1. When it is desired to shift the cam plate 17 endwise, the finger 18 is flexed inwardly towards the center of the guide cylinder so as to disengage the pin from the depressions 20, then the finger is moved endwise to bring the cam plate to the proper position. Upon being released, the finger 18 snaps back to its original position and in doing so moves the pin into one of the depressions 20 so as to hold the cam plate against accidental displacement.

The cam plate has a cam slot 21 therein with which engages a pin 22. This pin is connected to the adjusting mechanism of an iris diaphragm, well known to the art, forming part of the lens structure supported by carrier 6. Rotational movement of pin 22 around the axis of the lens carrier causes a variation in the size of the diaphragm light opening. Therefore, when the lens carrier 6 is moved along the guide cylinder 1 by a rotation of the cam tube 11, a variation in the size of the diaphragm opening results. The initial opening of the diaphragm may be altered to suit prevailing conditions by adjusting the cam plate 17 lengthwise of the guide cylinder in the manner already described, or the lens and diaphragm may be rotated with respect to the carrier and adjusting pin to produce the same result. The entire unit may be removed and the lens rotated by hand or an arm may be attached to the lens and be provided with a finger projecting out through the wall of the extension 3 in rotatable relation, as through a slot. Any well-known means may be furnished for preventing the entry of light.

A protecting sleeve 23 is attached to the flange 2 and surrounds the adjacent end of the guide cylinder and cam tube thereby preventing the passage of light through the guide slots 8. The cylindrical extension 3 of the guide cylinder is split at 24, the two halves being drawn together by a thumb screw 25 passing through ears 29 and 30 attached to the extension 3, and a conventional lens holder 26 fits within the extension and serves to connect the variable focus unit with a camera. This lens holder has a screw-threaded ring 27 pressed thereon and a stop ring or nut 28 is threaded to ring 27. This stop ring may be screwed in a right or left hand direction as viewed in Fig. 1, and serves as an index abutment or stop whereby the position of the guide cylinder with respect to the lens holder may be positively predetermined. In practice, if the stop ring 28 is once placed in a given position, the variable focus unit may be removed and replaced in exactly its original position, thereby obviating the necessity for refocusing the lens unit with respect to the camera film.

The front lens is supported by a sleeve 29, screw-threaded into engagement with the carrier 7 and has a clip 30 attached thereto for receiving a finger 31, by means of which the sleeve 29 may be rotated with respect to the carrier so as to focus the front lens independently of the position of the carrier. The finger 31 is made of spring steel or other resilient material and is tensioned so as to press against the edge of the cam tube 11. The result of this is that when the cam tube is in the extended position shown in Fig. 8, the finger lies nearly parallel therewith, whereas when the cam tube is withdrawn to the dotted position 32, the finger assumes the dotted position 33 out of the field of vision of the lens. The finger may be removed if desired by withdrawing it endwise from the clip 30. Sleeve 29 has graduations 34 thereon which serve in conjunction with an index mark on the carrier 7 to show the focal adjustment of the lens. An adjusting arm 60 is provided whereby the cam tube 11 may be rotated.

The front lens is preferably negative or divergent in character but a positive lens may be used by lengthening the whole unit and utilizing reversing prisms to invert the image; or the reversing prisms may be omitted and the film run backward through the associated camera. Likewise, if desirable, the front lens unit might comprise a pair of cylindrical or any other well known distorted lenses adapted to produce distorted images.

A device constructed in accordance with my invention has the added advantage that the cam tube 11 serves as a sun shade protecting the lens system from undesired light beams, in any of the different positions of the parts. This sunshading effect may be predetermined by properly proportioning the pitch of cam 14 with respect to the pitch of cam 12 and of cam 13. The pitch of cam 14 may be so selected that the end of the cam tube almost, but not quite, intrudes upon the picture plane of the associated film.

The cam tube structure of Fig. 1 may be modified in accordance with the showings in Figs. 9 to 12 inclusive, for mechanical reasons or to produce different efforts. In Fig. 9, the rear lens unit 6 has two optical elements 40 and 41 which may be moved towards or away from each other in order to correct for aberrations resulting from a change in the focal length of the entire unit. The rear optical element 40 has attached to it a pin 42 which engages with a cam groove 43 in a cam tube 44, corresponding to cam tube 11 of Fig. 1. The front optical element 41 has a similar pin which engages with a cam groove 45. The front lens unit 7 may be the same as that used in Fig. 1 and its cam is indicated by reference numeral 13, as in Fig. 1. Cam 14 serves the same function that it does in Fig. 1, i. e., to move the entire cam tube with respect to the guide cylinder, which is designated by reference numeral 1 as in Fig. 1. In operation, as the cam tube 44 is rotated, the cams 43, 45 and 13 advance the two optical elements 40 and 41, and the front lens unit 7, to maintain the proper focus. At the same time, due to the slight angle between the cam slots 43 and 45, the two optical elements 40 and 41 are moved relative to one another to bring about the necessary optical corrections. By means of this arrangement the entire variable focus unit may be maintained properly corrected as to color for example, regardless of the focal strength to which it is set.

Fig. 9 also shows how the cam tube may be made in two relatively rotatable pieces 81 and 82, telescoped together and held against relative rotation by a pin 83 passing through one of the holes 84. By removing the pin and turning 81 with respect to 82 the unit may be brought into initial focus on a given object plane. This feature may be incorporated in any of the structures shown in the other figures.

In Fig. 10, the cam tube 46 has but two cam grooves, 47 and 48, therein and the rear lens unit 6 is provided with a handle 49 by means of which that unit may be moved longitudinally of the guide cylinder 1 to change the magnification of the unit. As the handle 49 is moved longitudinally of the guide cylinder, the cam tube is rotated through the action of the cam 47 and, as a result of this rotation, the front lens unit 7 is adjusted to its proper position. In this type of device, the cam tube does not move endwise, being held against such movement by a grooved stop 50 which engages with a flange 51 formed integral with the cam tube.

In Fig. 11 the cam tube 52 is likewise held against endwise movement and is furnished with only two cams, both of which encircle the tube twice in order to cut down their pitch and reduce the resulting friction. The rear cam is indicated by reference numeral 53 and the front one by reference numeral 54. Because of the peculiar shape of the front cam necessary to maintain the unit focused on the film plane, it turns back and crosses itself at 55. In order to insure proper operation of the device, the pin 56 attached to the front lens unit 7 has an elongated cam rider shoe 57 which fits lengthwise within the cam groove thereby insuring that when the cam tube 52 is rotated the pin 56 will move from one extreme end of the cam groove to the other end, over the intersection, in a continuous movement always along the same path.

Fig. 12 shows a cam tube 58 having an external thread 59 screw-threaded into engagement with the stationary protecting sleeve 23 of the unit. The screw thread has external gear teeth on it which engage a worm gear 60 carried by a shaft 61' journaled on the sleeve 23. As the shaft 61' is rotated by turning crank 62', the cam tube 58 is both rotated and advanced endwise, thereby performing exactly the same function as cam tube 11 in Fig. 1. The thread 59 acts in the same way as the cam slot 14 of Fig. 1, and the shaft 61' and worm gear replace the operating handle 60 of that figure.

The variable focus lens unit may be adjusted by hand independently of the camera driving mechanism as already described, or a connection may be made between the camera driving mechanism and the variable focus unit so that the two are operated synchronously to produce a uniform increase or decrease in magnification within a predetermined length of film. An arrangement for performing this function is shown in Figs. 13 and 14 wherein 61 indicates generally a variable focus unit, having an adjusting arrangement of the type shown in Fig. 12, attached to a moving picture camera 62. The shaft 61' of Fig. 12 is replaced by a flexible connecting shaft 63 having at the end attached to the camera a stub shaft 66 carrying a pair of bevel gears 64 and 65. The stub shaft 66 has keyed to it a grooved collar 67. A shifting fork 68 is journaled within the groove of collar 67 and has at its end a pair of fingers 69 and 70 which are sufficiently spaced to receive between them a cam 71 fixed to a shaft 72. This shaft 2 is that already provided on certain cameras for energizing a driving gear mechanism positioned inside the camera, the function of which is gradually to open or close the shutter opening, for producing fade-outs. In present day cameras, for example those sold by Bell and Howell, the lever 73 attached to the shaft 72, is moved in one direction, for example the left to the position shown in Fig. 14, to engage an interior gear mechanism, not shown, so that upon subsequent rotation of the camera driving crank 74, the opening of the shutter 75 within the camera is gradually decreased to produce a fade-out effect. On the other hand, the reverse effect may be secured by moving the lever 73 in a right hand direction to the dotted position 76, to reverse the interior gear mechanism and bring about a gradual increase of the shutter opening as the crank 74 is turned. In the detail view of Fig. 14, a bevel gear 77 is illustrated as attached to the end of a shaft 78, connected to the shutter mechanism of the camera. This shaft is always turning when the camera is operating and serves as a means for rotation the drive shaft 63 of variable focus unit 61. When the lever 73 is moved in a left hand direction, the gear 64 is engaged with gear 77, thereby causing the focal length of the unit gradually to be increased. On the other hand, when the lever 73 is moved to the dotted position 76, the gear 65 is engaged thereby causing the focal length of the unit to be decreased gradually as the camera crank 74 is turned. In the neutral position 79 of the lever, both gears are disengaged.

From the preceding description it will be seen that the arrangement just described may serve to eliminate the adjustable iris or diaphragm and its accompanying cam mechanism, disclosed in connection with Fig. 1. As the magnification of unit 61 is made greater, the opening of shutter 75 is gradually increased to admit the proper amount of light so that the photographic speed of the camera and lens unit is always maintained constant. If it is desired to use the unit 61 without varying the shutter opening of the camera, this may be done by rotating the shifting fork 68 around the collar 67 out of engagement with the cam 71. In this case, for automatically maintaining constant photographic speed, the lens unit 61 should have an iris control mechanism such as disclosed in connection with Fig. 1. Once the shifting fork is disengaged from the cam, the camera may be used in the usual way entirely independently of the variable focus unit.

Instead of being split to encircle the outside of the attaching member 26, the extension 3 of guide cylinder 1 (Fig. 1) may be provided with external screw threads so as to screw into the attaching member 26 just like an ordinary lens.

A unit constructed in accordance with my invention is relatively light and compact, so may be attached to a lens turret in place of one of the several lenses ordinarily supplied for moving picture work. The use of this unit is not, however, confined to the taking of moving pictures, as it may also be used in conjunction with ordinary still cameras, projectors or other optical apparatus. It may function as a telephoto device, to increase the magnification of an ordinary camera lens system or may be used to decrease this magnification. In either, or both cases a smoothly varying local length may be obtained by a single simple operation, and adjustments necessary to focus on a nearer or more distant object are readily performed without altering the slope of the lens adjusting cams.

I have particularly described certains forms which my invention may take, merely for the purpose of illustration and it should be understood that various modifications and adaptations thereof may be made within the spirit of the invention as set forth in the appended claims.

What I claim is:

1. A variable focus lens unit comprising a guide cylinder, a pair of lenses positioned within said cylinder, carriers for said lenses adapted for movement longitudinally of said cylinder, a cam tube surrounding said cylinder and rotatable and longitudinally displaceable with respect thereto and having a pair of cams for engaging said lens carriers and a cam for engagement with a cam rider fixed to said guide cylinder.

2. A variable focus lens unit comprising a guide cylinder, a pair of lenses positioned within said cylinder, carriers for said lenses adapted for movement longitudinally of said cylinder, a cam tube surrounding said cylinder and rotatable with respect thereto and having a pair of cams for engaging said lens carriers, wherein one of said lenses has an adjustable diaphragm, and a cam is fixed to said guide cylinder for adjusting the opening of said diaphragm.

3. A variable focus lens unit comprising a guide cylinder, a pair of lenses positioned within said cylinder, carriers for said lenses adapted for movement longitudinally of said cylinder, a cam tube surrounding said cylinder and rotatable with respect thereto and having a pair of cams for engaging said lens carriers, wherein a sleeve is fixed to said guide cylinder and arranged to surround one end of said cam tube.

4. A variable focus lens unit comprising a guide cylinder, a pair of lenses positioned within said cylinder, carriers for said lenses adapted for movement longitudinally of said cylinder, a cam tube surrounding said cylinder and rotatable with respect thereto and having a pair of cams for engaging said lens carriers, wherein said cams are displaced with respect to each other longitudinally of said tube, said tube is divided circumferentially between the two cams, and means is provided for moving one-half of said tube with respect to the other half thereof.

5. A variable focus lens unit comprising a guide cylinder, a pair of lenses positioned within said cylinder, carriers for said lenses adapted for movement longitudinally of said cylinder, a cam tube surrounding said cylinder and rotatable with respect thereto and having a pair of cams for engaging said lens carriers, wherein said cam tube is screw-threaded to said guide tube.

6. A variable focus unit comprising a front lens, a rear lens, control means for synchronously adjusting the two lenses to maintain them in focus while varying their degree of magnification, and separate means for individually focusing said front lens.

7. A device in accordance with claim 6, wherein said front lens is negative.

8. A variable focus lens unit comprising a guide cylinder, a pair of lenses positioned within said cylinder, carriers for said lenses adapted for movement longitudinally of said cylinder, a cam tube surrounding said cylinder and rotatable with respect thereto and having a pair of cams for engaging said lens carriers, wherein a connector is attached to said guide cylinder for securing it to a camera, and index means is furnished for adjusting, in a predetermined manner, the position of said connector with respect to said guide tube.

9. A variable focus lens unit comprising a guide, a front lens and a rear lens carried by said guide, one of said lenses having a pair of optical elements adjustable relative to one another to correct for optical aberration, a plurality of cams for adjusting each of said lenses to vary the magnification of the unit, certain of the cams being shaped so as to adjust said optical elements one with respect to the other to obtain the necessary optical correction, and a single means for moving all of said cams in unison.

10. A variable focus lens unit comprising a guide cylinder, a pair of lenses slidably positioned within said guide cylinder, a cam tube encircling said guide cylinder and having a pair of cam slots cut therein, means for preventing rotation of said lens, a cam rider carried by each lens and adapted to be engaged by one of said cam slots, means for preventing longitudinal movement of said cam tube, and means for moving one of said lenses longitudinally of said guide cylinder.

11. A variable focus lens unit comprising a guide cylinder, a cam tube encircling said guide cylinder and having an external thread thereon, a sleeve fixed to said guide tube and adapted to engage with said thread, said thread having external teeth thereon, and a gear fixed with relation to said sleeve for engaging said teeth.

12. A variable focus lens unit comprising a guide cylinder, a lens carrier arranged to slide within said guide cylinder and having a cam rider projecting through a slot in the wall of said cylinder, a cam tube surrounding said cylinder and having a cam slot for engaging said rider, said cam slot being so cut as to encircle said tube and cross itself and said cam rider comprising an elongated shoe pivotally attached to said lens carrier and adapted to fit lengthwise in said groove.

OTTO B. DURHOLZ.